United States Patent [19]

Peregrina

[11] 4,106,761

[45] Aug. 15, 1978

[54] ELEVATED SUPPORT ANGULARLY ADJUSTABLE ON A SPHERICAL JOINT HEAD AND SAME BEARING A VISE

[76] Inventor: Carlos Morales Peregrina, Calle Floresta No. 131, Mexico 16 D.F., Mexico

[21] Appl. No.: 659,036

[22] Filed: Feb. 18, 1976

[30] Foreign Application Priority Data

Feb. 20, 1975 [MX] Mexico .................................. 156694

[51] Int. Cl.[2] .............................................. B23Q 3/04

[52] U.S. Cl. ...................................................... 269/75

[58] Field of Search ............................ 269/75, 57, 59; 248/179, 181, 187

[56] References Cited

U.S. PATENT DOCUMENTS 2,095,665 10/1937 Greth ..................................... 269/75

3,815,892 6/1974 Tulk ....................................... 269/75

*Primary Examiner*—Robert C. Watson

*Attorney, Agent, or Firm*—Michael J. Striker

[57] ABSTRACT

A support elevated over a substrate base and carried by a joint head whereupon it is angularly adjustable and fixable in a plurality of desired positions. The support is a bulky parallelopipedic body combined from a pair of mirror-like configured halves hinged one upon the other by means of at least one screw bolt located proximate to one end thereof. In their interior from their lower side, these halves are provided each with one hollow recess which together complementarily form a regular spherical cavity. The joint head is a pheric corpus mating by its configuration with the spherical cavity in the bulky body, and is provided on top of, and unitary with, a leg-like rod projecting upwardly from the substrate base. At the side of the bulky body distal from the hinging screw bolt, a tightening bolt is provided projecting to, and operable from, outside by means of which the interengagement of the pair of halves and between the cavity and the joint head may be either loosened or toughened for permitting, respectively, angular motion and fixation in a selected position of the bulky body. On top of the bulky body, a vise may be affixed operable for distancing or approaching its jaws by means of a screw bolt extending along the longitudinal axis of the bulky body.

6 Claims, 6 Drawing Figures

ELEVATED SUPPORT ANGULARLY ADJUSTABLE ON A SPHERICAL JOINT HEAD AND SAME BEARING A VISE

BACKGROUND OF THE INVENTION

Before the invention, . . conventionally supports or fastening devices were built . . . with a pair of jaws fixed on a workbench, the type widely known . . . having been one wherein only one jaw . . . was driven, but this type has many inconveniences for those using these . . . kinds of devices.

Also there have not been any supports capable of being inclined and/or rotated in quasi any position and apt, being massive enough, to reliably support various heavy implements and/or objects. The prior art has been short of devising a bulky supporting body comprising in itself a cavity solidly embracing a joint head on a heeling leg-like rod and capable of being loosened or tightened in the engagement of the wall of said cavity on such a joint head for, respectively, enabling operative angular displacement of said bulky support body or its fixation in a selected position on said joint head.

There have been . . . made many attempts to solve . . . the problem of such vises or supports, but, so far as it is known to the . . . inventor, until now there has been no attempt to build . . . a simple vise or support which could . . . be brought to different positions through angular displacements and . . . to carry heavy objects.

SUMMARY OF THE INVENTION

An object of the invention is to provide a fastening tool of the kind of a . . . vise which can . . . take . . . different . . . desired positions in angular range of 310° in the space and . . . of 360° in the plane.

It also is an . . . object of the invention . . . to provide . . . an elevated support on a joint head by means of which such a support or a support with a vise thereupon or . . . another object on the support can be set to different angular positions in the range of 310° in the space and 360° in the plane.

Another object of the invention is to provide a combination of a . . . vise and . . . a universal . . . articulating joint, permitting to . . . move the . . . vise at an angle of 360 ° in two dimensions and . . . of 310° in movements . . . in a third . . . dimension.

BRIEF DESCRIPTION OF THE DRAWINGS

FIG. 2 is a diagrammatic representation of a universal . . articulated joint head which is engaged with a . . . bulky body which can be . . . a support . . . for office articles in a receptacle that . . . is needed to be empted, a . . . table . . . or desk lamp, machine tools, for example, . . or drill machines, saws, telescopes, displayers . . . and the like;

Referring to FIG. 1 . . . there is shown an exemplary bulky support body 1 for jaws . . . 3, including at the bottom a hollow space of spherical design that is mounted on a . . . leg-like heeling rod 6 projecting upwardly from a substrate base and acting in a vise as a . . . mechanic support upholding the two jaws 3 that are integrated . . . one to a shiftable jaw holder 2 and the other to the bulky body 1. . . The latter bears operatively shiftable thereupon the jaw holder 2 . . . and is built of two mirror-like configured halves . . . each one including . . . one half . . . of a spherical cavity . . . These halves are connected by, and hinged on, two screws 8 and are . . . operable by a tightening screw bolt 4 that is used to . . . secure the bulky body when it has been installed in the desired position . . . on the joint head provided on top of the leg-like rod projecting from the substrate base.

As per se known, for . . . driving . . . the jaws, a threaded bar 10 is provided engaged with female threads inside the jaws, there also being longitudinal guide bolts 9 forming a travel path for said jaw holder 2.

Figure 1:
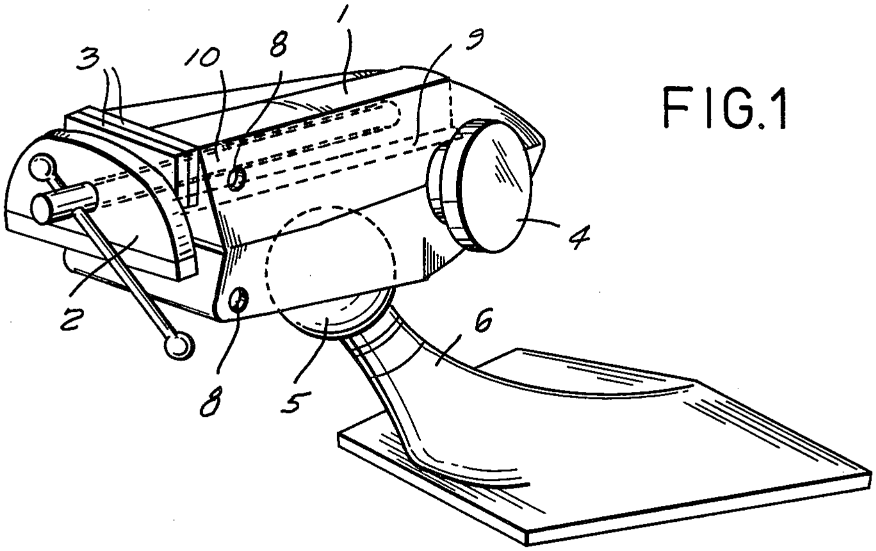
FIG. 1 is a persepective . . . view of a . . . vise according to the present invention which is mounted on a . . . . joint head, partially represented by a . . dotted line.
Figure 2:
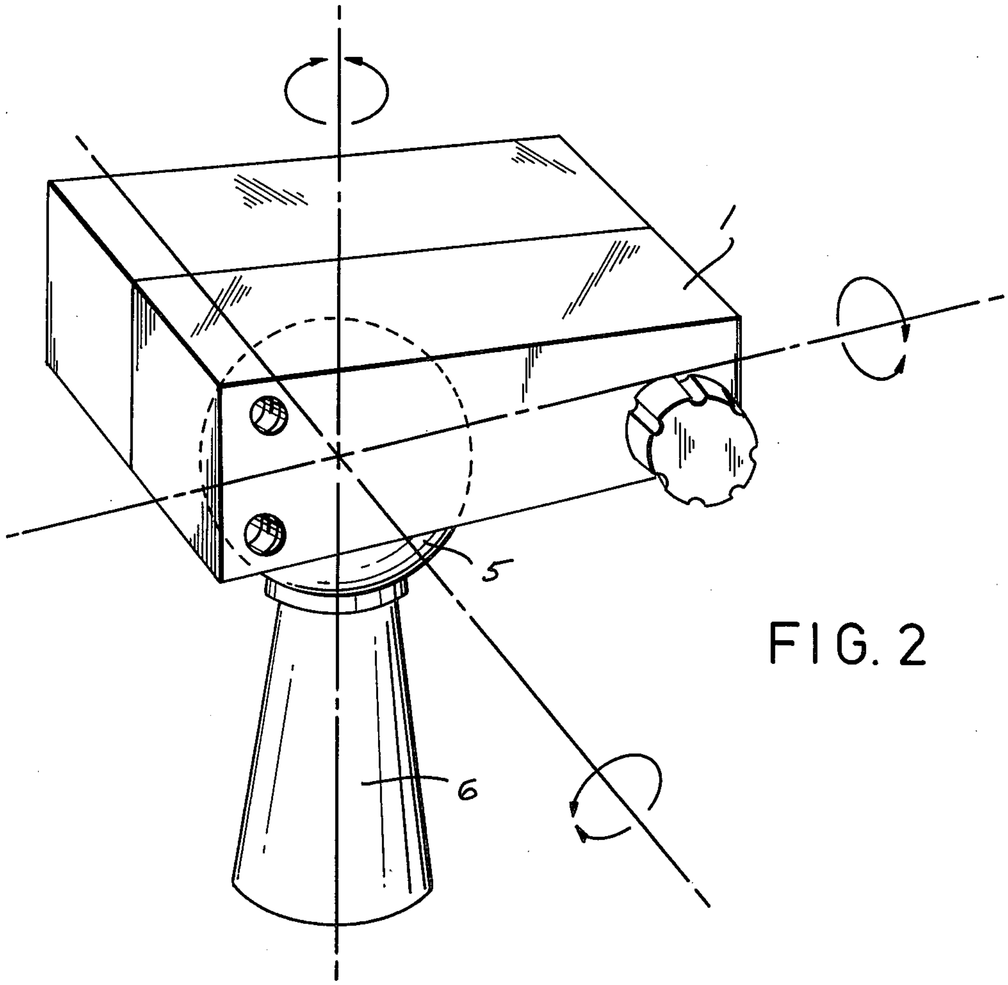

As can be seen in the drawings, and . . . especially in FIG. 2, the universal articulating joint head 5 consists of a spheric top corpus on a supporting leg-like rod and in said spherical cavity inside said bulky body 1 in which the spherical joint head 5 is encompassed and housed and which thus upholds said bulky body 1 in a manner such that it may be set to a plurality of spatial positions by movement in the range of 360° in the plane . . . and of 310° in the space.

Said bulky body 1 is built from a pair of mirror-like configured halves, each one of which includes one half of the spherical cavity housing said joint head 5. Owing to the connections, said bulky body 1 may be caused by operation of said tightening bolt to become either looser for permitting the desired angular motions of the bulky body 1, or tightened to secure this bulky body 1 in the selected position.

Figure 3:
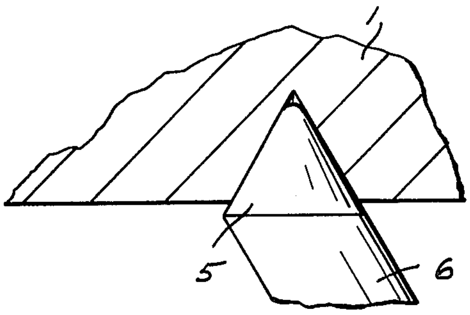
FIG. 3 is a view showing a portion of a bulky body of a vise with a conical cavity in which a conical linking joint head of a support is received.
Figure 5:
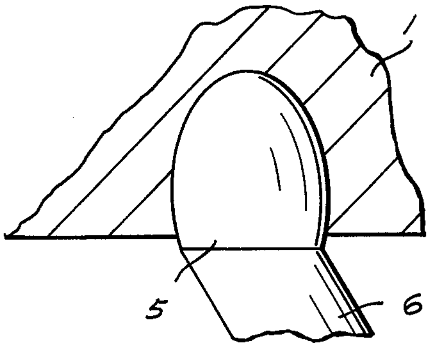
FIG. 5 is a view corresponding to that shown in FIG. 3, but wherein the cavity and the linking joint head are of the configuration of an ellipsoid.
Figure 4:
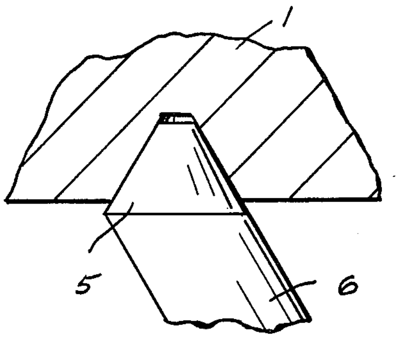
FIG. 4 is a view corresponding to that shown in FIG. 3, but wherein the cavity and the linking joint head are of the configuration of a truncated cone.
Figure 6:
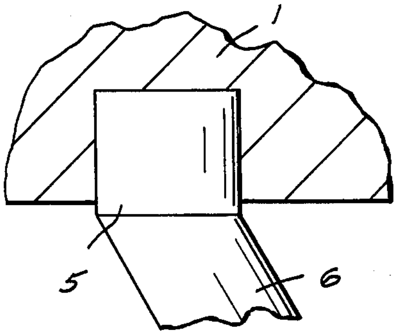
FIG. 6 is a view corresponding to that shown in FIG. 3, but wherein the cavity and the linking joint head are of the configuration of a cylinder.

The here described embodiment is a mere nonlimitative example, since, in the spirit of the invention, the articulated joint can be designed in various forms, e.g. the supporting joint head can have any suitable geometric configuration, such as that of a cone (as shown in FIG. 3), a truncated cone (as shown in FIG. 4), a cylinder (as shown in FIG. 6), an ellipsoid (as shown in FIG. 5) and the like, for adequately serving for various purposes. Furthermore, though the joint . . . is . . . directed to support a tool named . . . vise, . . there can be substituted therefor, for being supported, any other tools or working elements, toys, office articles, etc. . . by . . . their proper fixation.

What is claimed as new and desired to be protected by Letters Patent is set forth in the appended claims.

1. A vise arranged on an elevated support adapted to be capable to be brought in different angular positions and fixed therein and movable into these positions on, and carried by, a universal linking joint head elevated over a substrate base, comprising an elongate parallelopipedic bulky body composed of a pair of mating mirror-like configured halves coupled to one another at one end thereof by at least one hinging bolt, each of said halves of said bulky body forming within its lower part one half of a unitary cavity for receipt of said linking joint head formed on top of a support leg-like rod projecting upwardly from said substrate plate, said cavity being configured to mate with, and surround, said joint head, wherein said bulky body, on the side distal from that of coupling of said halves by at least one hinging bolt, comprises a tightening bolt passing through said halves and being operable from outside to either loosen or tighten the engagement between said pair of halves and thereby also between the wall of said cavity and said linking joint head for enabling, respectively, angular motions of said bulky body and its securing in a desired angular position, said support being provided on its upper side with the assembly of a vise comprising one jaw fixed to said bulky body and the other jaw unitary with an elongate holder located on, and shiftable along, rail members extending longitudinally of said bulky body, said holder and both said jaws being provided with female threads, while a matingly threaded screw bolt operable from outside passes through said jaws and said holder to enable mutual distancing and approaching of said jaws.

2. The vise as defined in claim 1, wherein said linking joint head and said receiving cavity are of a ball-like configuration.

3. The vise as defined in claim 1, wherein said linking joint head and said receiving cavity are of the configuration of a cone.

4. The vise as defined in claim 1, wherein said linking joint head and said receiving cavity are of the configuration of a truncated cone.

5. The vise as defined in claim 1, wherein said linking joint head and said receiving cavity are of the configuration of an ellipsoid.

6. The vise as defined in claim 1, wherein said linking joint head and said receiving cavity are of the configuration of a cylinder.

* * * * *